(12) United States Patent
Kershaw et al.

(10) Patent No.: US 11,230,295 B2
(45) Date of Patent: Jan. 25, 2022

(54) SOFTWARE INTERLOCK

(71) Applicant: JAGUAR LAND ROVER LIMITED, Coventry (GB)

(72) Inventors: Charlotte Kershaw, Warwickshire (GB); Christopher Wild, Warwickshire (GB); Mark Grant, Warwickshire (GB); Miguel Lopez, Warwickshire (GB); Francois Loubaresse, Warwickshire (GB); Christophe Fava-Rivi, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/311,510

(22) PCT Filed: Jun. 19, 2017

(86) PCT No.: PCT/EP2017/064954
§ 371 (c)(1),
(2) Date: Dec. 19, 2018

(87) PCT Pub. No.: WO2017/220500
PCT Pub. Date: Dec. 28, 2017

(65) Prior Publication Data
US 2019/0193744 A1 Jun. 27, 2019

(30) Foreign Application Priority Data
Jun. 20, 2016 (GB) .................................. 1610726

(51) Int. Cl.
*B60W 50/00* (2006.01)
*B60L 3/00* (2019.01)
(Continued)

(52) U.S. Cl.
CPC ....... *B60W 50/0098* (2013.01); *B60L 3/0007* (2013.01); *B60L 3/0015* (2013.01);
(Continued)

(58) Field of Classification Search
CPC ............. B60W 50/0098; B60W 10/30; B60W 2554/801; B60W 2554/80; B60W 30/14;
(Continued)

(56) References Cited

U.S. PATENT DOCUMENTS 8,539,448 B2 * 9/2013 Neupartl .............. G05B 19/056
717/124
9,537,744 B2 * 1/2017 Mabuchi ................. H04L 43/10
(Continued)

FOREIGN PATENT DOCUMENTS

WO 2013081533 A1 6/2013

OTHER PUBLICATIONS

Search and Examination Report, GB1610726.0, dated Dec. 20, 2016, 8 pp.
(Continued)

*Primary Examiner* — Frederick M Brushaber
(74) *Attorney, Agent, or Firm* — McCoy Russell LLP

(57) ABSTRACT

According to an aspect of the present invention, there is provided an interlock component for a software system. The interlock component may comprise an input for receiving an interaction request for a first system component and system data. The interlock component may comprise a processor arranged to assess the interaction request and the system data relative to predefined system logic rules to determine if the interaction request satisfies the system logic rules. The interlock component may comprise an output arranged to output the interaction request to the first system component in the event that the system logic rules are satisfied.

14 Claims, 7 Drawing Sheets

(51) Int. Cl.
    *B60W 10/30*     (2006.01)
    *B60W 30/14*     (2006.01)
    *G05B 15/02*     (2006.01)

(52) U.S. Cl.
    CPC ............. *B60W 10/30* (2013.01); *B60W 30/14* (2013.01); *B60W 2420/52* (2013.01); *B60W 2520/10* (2013.01); *B60W 2554/80* (2020.02); *B60W 2554/801* (2020.02); *B60W 2720/10* (2013.01)

(58) Field of Classification Search
    CPC ......... B60W 2520/10; B60W 2420/52; B60W 2720/10; B60L 3/0007; B60L 3/0015; G05B 15/02
    See application file for complete search history.

(56) References Cited

U.S. PATENT DOCUMENTS

| | | | | |
|---|---|---|---|---|
| 10,248,405 | B2* | 4/2019 | Zymeri | G06F 8/654 |
| 10,814,879 | B2* | 10/2020 | Miura | B60W 40/06 |
| 2003/0051235 | A1* | 3/2003 | Simpson | G06F 8/60 |
| | | | | 717/174 |
| 2008/0228957 | A1* | 9/2008 | Meyer | G05B 19/0426 |
| | | | | 710/19 |
| 2009/0314233 | A1* | 12/2009 | Zajac | F01L 1/182 |
| | | | | 123/58.9 |
| 2010/0293363 | A1* | 11/2010 | Meyer | G05B 19/0426 |
| | | | | 713/1 |
| 2013/0160726 | A1* | 6/2013 | Zajac | F16K 39/024 |
| | | | | 123/90.1 |
| 2014/0359564 | A1* | 12/2014 | Francois | G06F 8/30 |
| | | | | 717/106 |
| 2015/0134225 | A1 | 5/2015 | Kinugawa et al. | |
| 2015/0185732 | A1 | 7/2015 | Debouk et al. | |
| 2015/0266476 | A1 | 9/2015 | Sangemeswaran et al. | |
| 2016/0092752 | A1* | 3/2016 | Nakashima | G06K 9/00973 |
| | | | | 382/190 |
| 2019/0077407 | A1* | 3/2019 | Miura | G01S 7/4039 |
| 2019/0145150 | A1* | 5/2019 | Kidena | G06N 20/00 |
| | | | | 701/49 |
| 2019/0256104 | A1* | 8/2019 | Shimizu | B60W 30/09 |
| 2019/0345887 | A1* | 11/2019 | Aoki | B60W 10/06 |
| 2020/0047772 | A1* | 2/2020 | Yasue | B60W 10/20 |

OTHER PUBLICATIONS

Search and Examination Report, GB1709728.8, dated Dec. 20, 2017.

International Search Report and Written Opinion, PCT/EP2017/064954, dated Nov. 7, 2017.

* cited by examiner

SOFTWARE INTERLOCK

CROSS-REFERENCE TO RELATED APPLICATIONS

This application is a 371 of International Application No. PCT/EP2017/064954, filed Jun. 19, 2017, which claims priority to GB Patent Application No. 1610726.0, filed Jun. 20, 2016, the contents of both of which are incorporated by reference herein in their entirety.

TECHNICAL FIELD

The present disclosure relates to a software interlock and particularly, but not exclusively, to a software interlock implementation for vehicle control, for example for controlling a vehicle driveline of a driveline component. Aspects of the invention relate to an interlock component for a software system, to a method of operating an interlock component, a stub component for a software system component, to a method of operating a stub component, to a method of generating the afore-mentioned components and to a vehicle.

BACKGROUND

Interlocks are used to prevent undesired states or actions from occurring in a range of electrical, electronic and mechanical systems. They are particularly useful in systems that perform a predetermined sequence of actions dependent on a sequence of events with which they are presented. In such systems, interlocks help to prevent a machine from damaging its operator, or from damaging itself, by stopping the machine from performing a certain action when the interlock 'switch' is tripped. Interlocks may be implemented in hardware (for example, in the case of a microwave oven, interlocks can be implemented as physical on/off switches, preventing the microwave from operating when the door is not fully closed) or in software (for example, as logic True/False switches). Software interlock implementations are particularly important in safety critical software, for example in the automotive, aerospace and medical technical fields, providing a robust block on the function of a particular component under specific circumstances.

Many current systems are modular in nature, and comprise individual component modules, each having an individually-customised interface via which interactions with other component modules are carried out. The implementation of software interlocks into such systems requires the software controlling each component module to be written/re-written to ensure that each component module accepts the necessary interlock software functionality. Similarly, each interlock must be individually tailored so as to be compatible with the unique interface of its associated component module.

In this scenario, system designers must work closely with one another, programming the software interlocks hand-in-hand with the original software, in order to ensure that the interlock functionality matches the interfaces of the component module with which it is associated. This scenario also requires that the system integrators have expert working knowledge of the different types of software used to program each component, as the system integrators are responsible for consolidating all of the separately-programmed components (with their own interlocks) into a single customised system, and ensuring that the system then runs smoothly.

One of the problems associated with the current approach outlined above is the resultant lack of flexibility in the system: component modules and their associated interlocks are specifically programmed to interact and function in a particular way, in response to a specific set of events or conditions. This problem is compounded by the fact that the customised programming of interlocks and component modules is very difficult for the system integrator to debug/troubleshoot, due to the lack of standardisation across different systems. Therefore, if the requirements of a system change slightly, it is not possible for the system integrator to easily modify the components in situ to reflect this.

These problems become particularly evident when a system is composed wholly or partially of Commercial Off-the-Shelf (COTS) components, each of which is obtained from a different supplier. Such systems are in widespread use as COTS components are cheap and easily obtainable, however a major drawback of these systems is that the system integrator is not able to easily integrate interlocks (based on their own specific requirements) into the finished components they obtain from the suppliers. Instead, the supplier would need to produce both the component and the interlock themselves. Furthermore, if the end-user's requirements were to change even slightly, they would need to request new components and interlocks from the supplier, which is time-consuming and expensive.

For example, in the case of an interlock mechanism implemented in a vehicle, if the safety standards for the vehicle are changed (whether due to changing industry standards, or due to the need to integrate the system into a vehicle with slightly different specifications), it is not possible for an interlock, which is integrated with pre-installed components in the vehicle system, to be easily modified to reflect the changes. Instead, the system integrator would need to spend considerable time and effort analysing the software code of the interlock and component in order to modify the functionality. Alternatively, a new component with a new interlock mechanism will need to be programmed and produced by the supplier, and subsequently purchased and integrated into the vehicle system by the end-user. Either approach results in increased time and cost spent in adapting components, which is an undesirable outcome.

The present invention has been devised to mitigate or overcome at least some of the above-mentioned problems.

SUMMARY OF THE INVENTION

Aspects and embodiments of the invention provide an interlock component for a software system, a stub component for a software system component, a method of operating an interlock component, a method of operating a stub component, and a vehicle comprising the afore-mentioned interlock component, a method for generating an interlock component and a stub component for a software system, a non-transitory computer-readable storage medium, and a vehicle substantially as claimed in the appended claims.

According to an aspect of the present invention there is provided an interlock component for a software system comprising: an input for receiving an interaction request for a first system component and system data; a processor arranged to assess the interaction request and the system data relative to predefined system logic rules to determine if the interaction request satisfies the system logic rules; and an output arranged to output the interaction request to the first system component in the event that the system logic rules are satisfied.

The system data received at the input may comprise one or more of: system environment data, sensor data, system related data received from a further device or system (e.g. in a vehicle embodiment, system data may be received from a breathalyser).

The first system component may be in operative communication with a first system and the interaction request may comprise a control signal for controlling the first system. Alternatively, the interaction request comprises a control signal for controlling the first system component.

According to a further aspect of the present invention there is provided an interlock component for a software system comprising: an input for receiving an interaction request for a first system component and system environment data; a processor arranged to assess the interaction request and the system environment data relative to pre-defined system logic rules to determine if the interaction request satisfies the system logic rules; and an output arranged to output the interaction request to the first system component in the event that the system logic rules are satisfied.

The above configuration of the interlock component is advantageous in that it allows the interlock component to act as a robust safety feature in the software system, and prevent the transmission of an interaction request to the system component in the event that the system logic rules (which may relate to safety standards that must necessarily be met) are not satisfied. This therefore advantageously provides a system integrator with the freedom to customise the functionality of an interlock component by defining system logic rules to suit a particular purpose (for example, specific safety-related conditions that must be met). This is particularly important in safety-critical systems, where the safety standards are regularly updated. Example applications of such systems include the aerospace, rail and automotive industries, as well as in medical devices. Other uses of this invention could be, but are not limited to, systems that don't allow auto-drive disengage if driver's hands are not detected on the steering wheel; industrial systems, for example to prevent a safety screen being raised if a machine tool is active, or to prevent a furnace door being opened if the furnace is hot; preventing a display screen being changed to show other functions if a safety-critical message is being displayed.

Optionally, the interaction request is received by the interlock component from a second system component, and is directed towards a first system component.

Advantageously, this enables the interaction between COTS system components to be automated and controlled to conform to specific pre-defined conditions, without requiring input from the system designer or system integrator once the components have been integrated into the system.

Optionally, the first system component comprises a proxy component and a stub component interface. The second system component may send interaction requests to the first system component via the proxy component of the first system.

In this configuration, the proxy functions as the interface for the first component, managing the routing of interaction requests from other system components; the stub is in operative communication with both the proxy and the first component, ensuring that the appropriate requests reach the first system component. Advantageously, the use of the proxy-stub combination enables the two system components to communicate easily with one another, even if they were not originally designed to do so. In addition, this configuration also means that the two system components may be located remotely from one another (e.g. in separate memory spaces within the system) without experiencing any communication difficulties.

The interaction request from the second component may be relayed to the input of the interlock component via the stub component interface of the first system component. The output of the interlock component may be arranged to output the interaction request back to the stub component interface of the first system component.

Advantageously, this ensures that the interlock component receives the interaction request for the first component, and is able to take into account the system data when applying its internal system logic rules to assess the allowability of the request. This ensures that the interlock component only relays to the first component those interaction requests that it has determined to be safe and allowable. The safety requirements of the system can therefore be adhered to as there will be no scenario in which a potentially safety-critical interaction request could reach the first system component without having been first analysed (and vetted) by the interlock component.

A further advantage of this configuration is that whilst the interlock component is able to control the interaction requests received by the first component, it is not necessary for the interlock component to communicate directly with any of the system components—the interlock component communicates only with the stub component. Therefore, the interlock component may be inserted (or re-inserted, if it is altered whilst the system is in use) easily into a system composed of COTS components, without requiring the main system components to be re-programmed, which is a difficult and time-consuming process.

The software system may comprise a control system for a vehicle. The first system component may be a powertrain or a vehicle driveline system component. The second component may be a cruise control system component.

Alternatively, or additionally, the software system may comprise a control system for a vehicle. The first system component may comprise an ignition control component which is in operative communication with a vehicle powertrain or driveline component. The second system component may comprise a breathalyser component.

Optionally, the cruise control system component comprises a logic component which is in communication with a vehicle speed sensor.

Optionally, the interaction request comprises a request for the powertrain component to increase the vehicle speed.

Optionally, the system data may be received by the interlock component from a third system component. The third system component may be a radar component in operative communication with a vehicle radar.

Optionally, the system data corresponds to vehicle environment data, and may comprise information relating to the presence of an object in the vicinity of the vehicle.

Advantageously, the above configuration ensures that the interlock component makes use of vehicle environment data when assessing the allowability of the interaction request (for example, taking into account the presence of an object in the vicinity of the vehicle using a vehicle radar, when allowing the cruise control to increase the vehicle speed). This ensures that the surroundings of the vehicle are analysed and taken into account when making potentially safety-critical decisions, and allows the safety requirements of the vehicle control system to be met.

According to another aspect of the present invention, there is provided an interlock component for a software system as described above, wherein the processor comprises an electronic processor having an electrical input for receiving the interaction request and an electrical output for outputting the interaction request to the first system component, wherein the interlock component comprises an electronic memory device electrically coupled to the electronic processor and having instructions stored therein, the processor being configured to access the memory device and execute the instructions stored therein such that it is operable to assess the interaction request and the system data relative to predefined system logic rules to determine if the interaction request satisfies the system logic rules.

According to a further aspect of the present invention there is provided a method of operating an interlock component comprising: receiving, using an input, an interaction request for a vehicle system component and vehicle environment data; assessing, using a processor, the interaction request and the vehicle environment data relative to predefined vehicle logic rules; determining, using the processor, if the interaction request satisfies the vehicle logic rules; and transmitting, to a vehicle system component, the interaction request in the event that the vehicle logic rules are satisfied.

It should be noted that features described in relation to the aspects of the invention when expressed in terms of a system apply equally to the invention when expressed in terms of a method.

According to another aspect of the present invention, there is provided a stub component for a software system component comprising: an input for receiving an interaction request for the software system component; a processor for determining if the interaction request falls into a predetermined category of interaction request; and an output for outputting the interaction request to the software system component if it does not fall into the predetermined category, wherein the processor is arranged to reroute the interaction request to an interlock component in the event that it falls into the predetermined category and to forward the interaction request to the software system component in the event that the interaction request is received back from the interlock component.

Optionally, the predetermined category of interaction request may comprise a safety critical interaction request.

According to another aspect of the present invention, there is provided a stub component for a software system component as described above, wherein the processor comprises an electronic processor having an electrical input for receiving the interaction request and an electrical output for outputting the interaction request to the software system component, wherein the stub component comprises an electronic memory device electrically coupled to the electronic processor and having instructions stored therein, the processor being configured to access the memory device and execute the instructions stored therein such that it is operable to determine if the interaction request falls into a predetermined category of interaction request.

According to a further aspect of the present invention, there is provided a method of operating a stub component for a software system component comprising: receiving an interaction request for the software system component; determining if the interaction request falls into a predetermined category of interaction request; and outputting the interaction request to the software system component if it does not fall into the predetermined category, wherein the method comprises: rerouting the interaction request to an interlock component in the event that it falls into the predetermined category; and forwarding the interaction request to the software system component in the event that the interaction request is received back from the interlock component.

According to another aspect of the present invention, there is provided a method for generating an interlock component and a stub component for a software system comprising: receiving a specification relating to a first system component, the specification defining interaction requests to be received by the first system component; receiving an interlock specification relating to an interlock component, the interlock specification containing a predetermined category of interaction requests to be processed by the interlock component, data to be received by the interlock component and system logic rules for processing received requests in dependence on received data; generating the stub component for the first system component, the stub component comprising a stub instruction set for determining if received requests fall into the predetermined category of interaction requests and for rerouting received requests within such a category to the interlock component; and generating the interlock component which is arranged to communicate with the stub component for the first system component, the interlock component comprising an interlock instruction set for assessing received interaction requests in dependence on received data and system logic rules.

Optionally, the method may comprise receiving an interlock data interface. The interlock data interface may comprise information relating to the requirements for enabling communication between the interlock component and other system components, including the first system component.

According to another aspect of the invention, there is provided a vehicle comprising the interlock component as described above.

According to a further aspect of the invention, there is provided a computer storage medium comprising computer-readable instructions for a computer to carry out one or more of the methods as described above.

According to a yet further aspect of the invention, there is provided non-transitory computer-readable storage medium storing executable computer program instructions to implement one or more of the methods as hereinbefore described.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
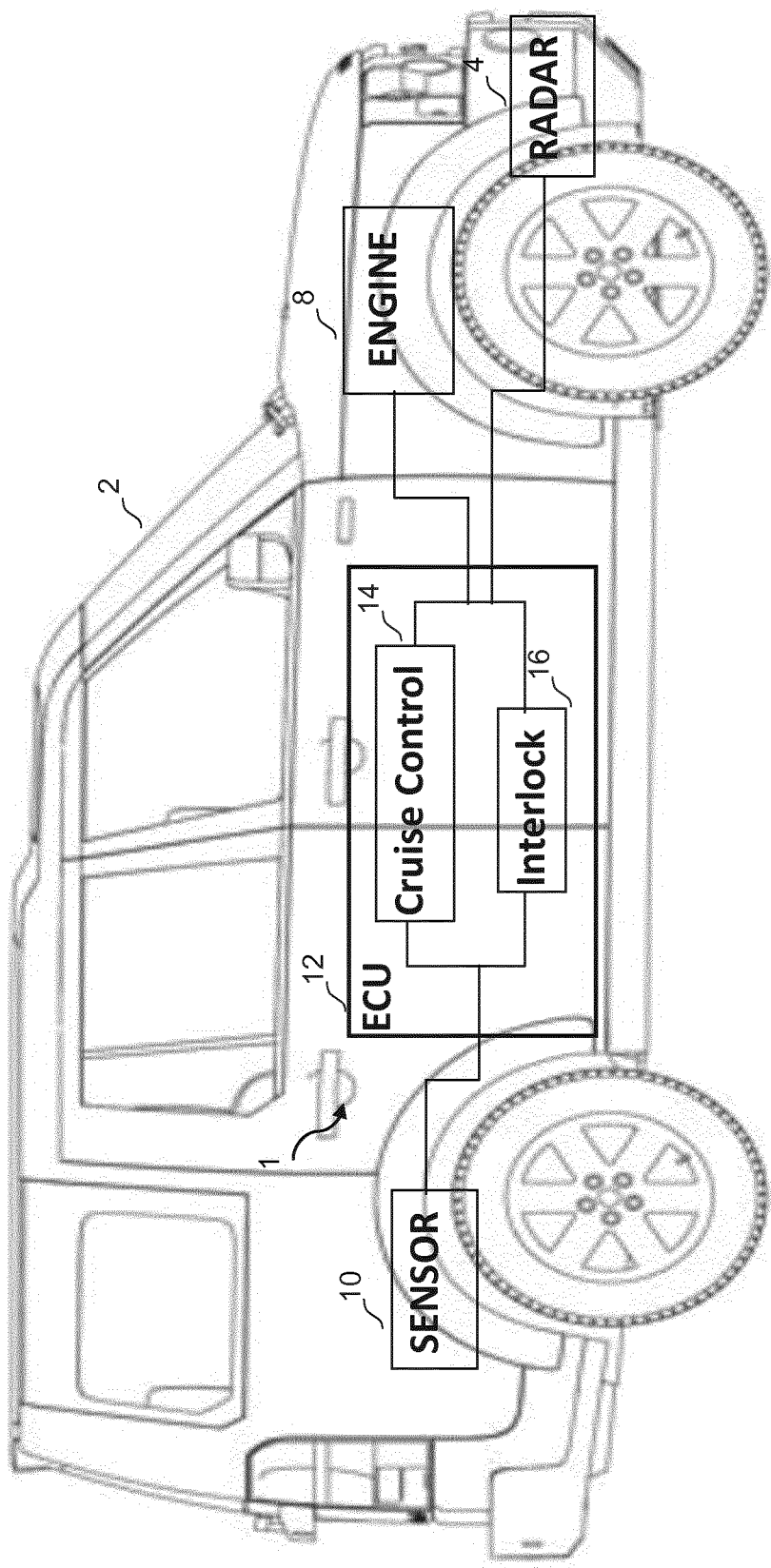
FIG. 1 is a schematic block diagram of a vehicle control system, implemented in a car, according to an embodiment of the present invention.

FIG. 1 shows a schematic block diagram of a Vehicle Control System (VCS) 1 that has been implemented in a vehicle 2 according to an embodiment of the present invention. The VCS comprises a vehicle radar 4, which collects and outputs vehicle environment data (for example, a determination if there is an object in front of the vehicle); a vehicle engine 8, which varies the speed of the vehicle; and a vehicle speed sensor 10, which monitors the speed of the vehicle. The vehicle radar 4, vehicle engine 8 and vehicle speed sensor 10 are all individually in communication with an Engine Control Unit (ECU) 12. The ECU 12 comprises a cruise control module 14 and an interlock component 16 which interact with one another in order to safely control the vehicle drive conditions. A more detailed breakdown of each of the VCS components, as well as the process by which an interaction request is communicated through the system 1, is provided in FIGS. 3, 4 and 5.

It will be clear to the skilled person that the exact layout of the components for a particular VCS may be varied from the embodiment that is shown in FIG. 1, without affecting functionality of the system, and that such variations also fall within the scope of the present invention. For example, it is envisioned that the positions of the engine, radar component or ECU module may be varied as long as their ability to communicate with one another remains intact. Furthermore, although FIG. 1 shows a single sensor connected to one of the wheels of the car, it is possible to vary the wheel at which the sensor is positioned, or to have a plurality of sensors, each one monitoring an individual wheel. Additionally or alternatively, the required vehicle speed information could be derived from other different types of sensors (for example, GPS sensors), or from a combination of sensor types.

Figure 2:
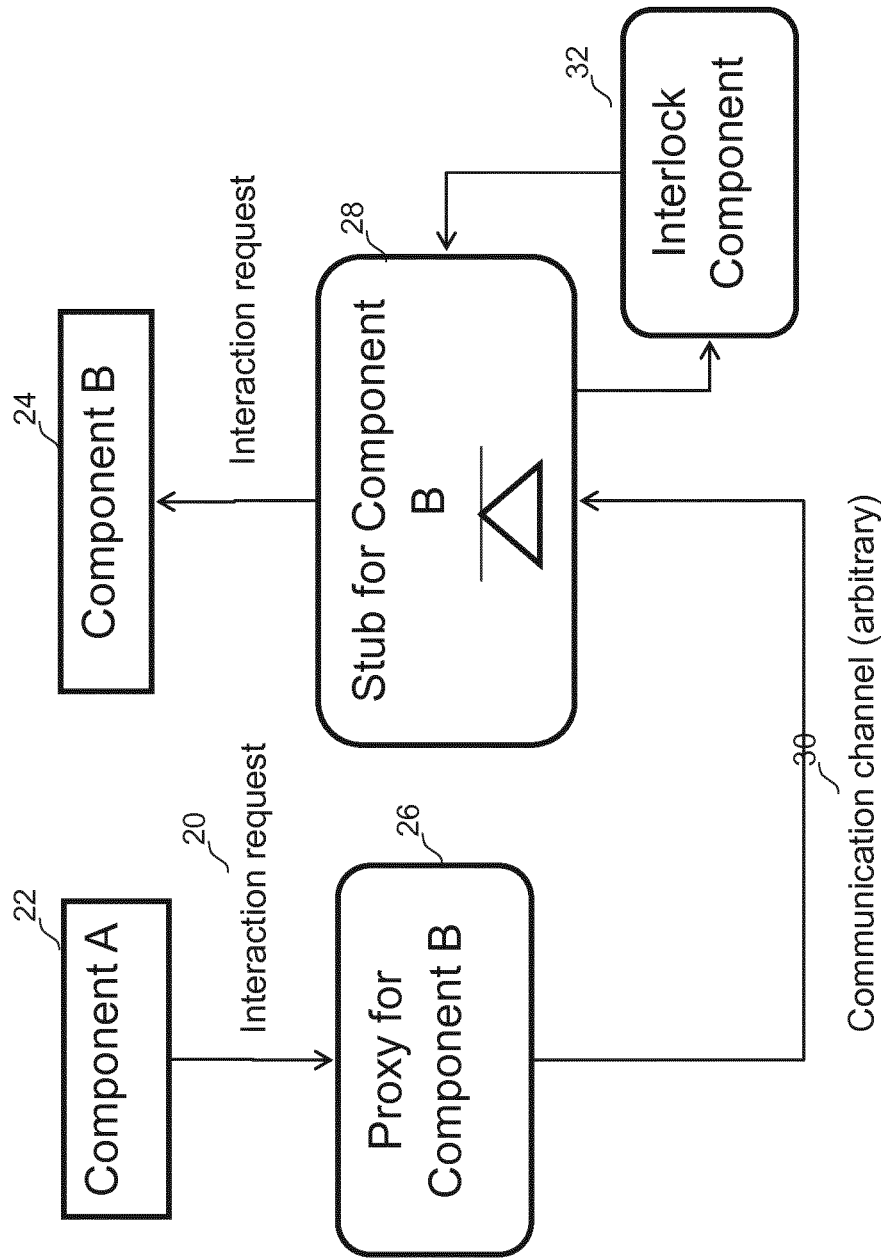
FIG. 2 is a high-level flow diagram of the general method by which an interaction request is communicated between components of a vehicle control system, such as that in FIG. 1.

FIG. 2 shows the generalised flow of information data between two components (A and B) of a typical VCS, according to an embodiment of the present invention. In this specific case, the information data corresponds to an interaction request 20, comprising a control or command signal for component B, which is transmitted from Component A 22 to Component B 24. In addition to the two main components A and B, the VCS also comprises intermediary components—a proxy 26 and a stub 28 for Component B—via which communication with Component B is carried out.

The main function of the Component B proxy 26 is to manage the distribution and routing of the interaction request from Component A 22 to the portion of the system where Component B 24 is situated. This is achieved using a communication channel 30 between the proxy 26 and its counterpart, the Component B stub 28, the latter of which is located in the same portion of the system as Component B. The Component B proxy 26 is in operative communication with Component A, and the stub 28 for Component B is in operative communication with Component B. An interaction request 20 is thereby transmitted from Component A, through the Component B proxy 26 and stub 28, and must subsequently be received by Component B for an action to occur.

The use of the proxy-stub combination enables the two main system components to communicate with one another easily, even if they were not originally designed to do so, because the proxy provides the same functional interface as would be provided by Component B, such that for all intents and purposes, it would appear to Component A that it is interacting/communicating directly with Component B. In addition, the communication between proxy and stub is easily carried out even if the components are located in separate portions (or separate areas of memory space) of the system, as is generally the case in safety-critical systems to increase system robustness.

The embodiment pictured in FIG. 2 also comprises an interlock component 32 which is in operative communication with the Component B stub 28, such that the interaction request reaching the stub 28 is re-routed to the interlock component 32 before it can be passed to Component B. The interlock component 32 is able to analyse the interaction request 20 against predetermined internal vehicle logic rules, and thereby determine if the request is acceptable to be passed to Component B. The result of this analysis is transmitted to the stub 28, and if the interaction request 20 has been deemed acceptable, it is subsequently passed to Component B. Otherwise, the interaction request 20 is refused by the stub 28 and is not passed to Component B. It should be noted that in the system of this embodiment, the interlock component 32 communicates only with the Component B stub 28, and does not communicate directly with either of the main components A and B.

Figure 3:
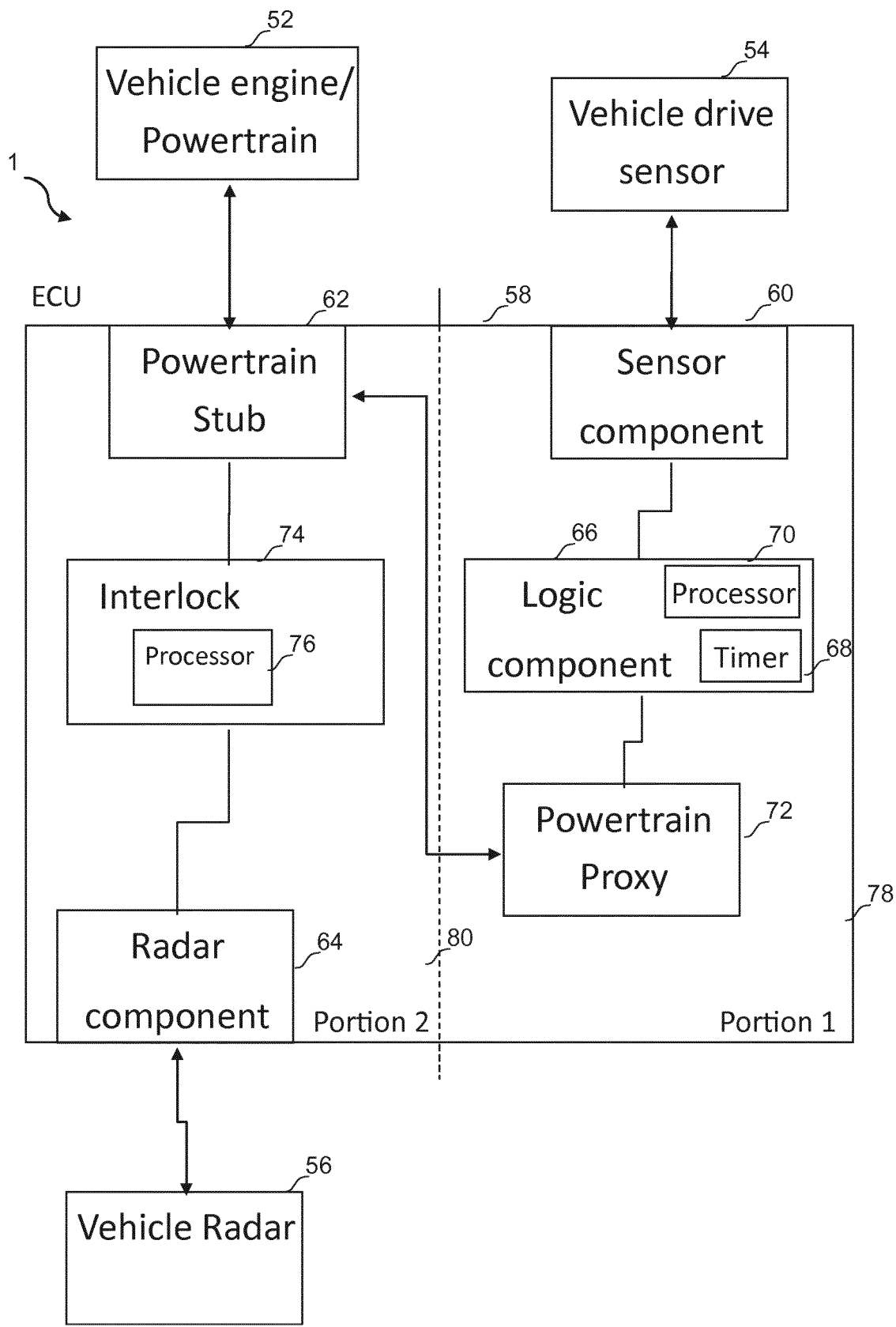
FIG. 3 is a schematic block diagram showing details of the components of the vehicle control system of FIG. 1.

FIG. 3 shows a schematic block diagram of the VCS 1 implemented in a vehicle in the embodiment shown in FIG. 1, and presents a detailed breakdown of the components present in the VCS which enable automated control of the speed of the vehicle.

The VCS 1 comprises a vehicle powertrain (including a vehicle engine) 52, a vehicle drive sensor 54, a vehicle radar 56 and an Engine Control Unit (ECU) 58.

The ECU 58 in turn comprises a sensor component 60, a powertrain stub component 62 and a radar component 64, each of which facilitates communication between the ECU 58 and the vehicle drive sensor 54, the powertrain 52 and the vehicle radar 56 respectively.

The ECU 58 further comprises a logic component 66, having a timer 68 and an ECU processor 70, and an interlock component 74 comprising an interlock processor 76. It is noted that the logic component 66 functionally corresponds to the cruise control 14 component of FIG. 1.

In use, the logic component 66 monitors information data received from the sensor component 60 (for example, by using the timer 68), and generates (using the processor 70 and in-built logic rules) an interaction request for the powertrain to vary the speed of the vehicle. This interaction request is transmitted to the powertrain 52 via powertrain proxy 72 and powertrain stub 62 components.

The interlock component 74 receives specific interaction requests from the powertrain stub 62, and determines (using the interlock processor 76) whether the request is acceptable to be passed on to the powertrain based on information received from the radar component 64, and a set of pre-programmed vehicle logic rules.

The ECU is divided into two portions of memory space 78, 80, in order to separate those components involved in the generation of the interaction request from those components which receive and analyse the interaction request—the sensor, logic and powertrain proxy components (60, 66, 72) are therefore located in a first portion 78 of the ECU memory space, whilst the radar component, interlock component and powertrain stub (56, 74, 62) are located in a second portion 80 of ECU memory space. This separation of request-issuing and request-receiving components into different memory spaces increases system robustness.

The VCS shown in the embodiment of FIG. 3 utilises the generalised method of handling interaction requests between components as shown in FIG. 2, with the powertrain 52 corresponding to Component B, the logic component 66 corresponding to Component A, and the interaction request corresponding to a request for the powertrain to vary the vehicle speed (in other words the interaction request comprises a control signal to control the vehicle powertrain).

Figure 4:
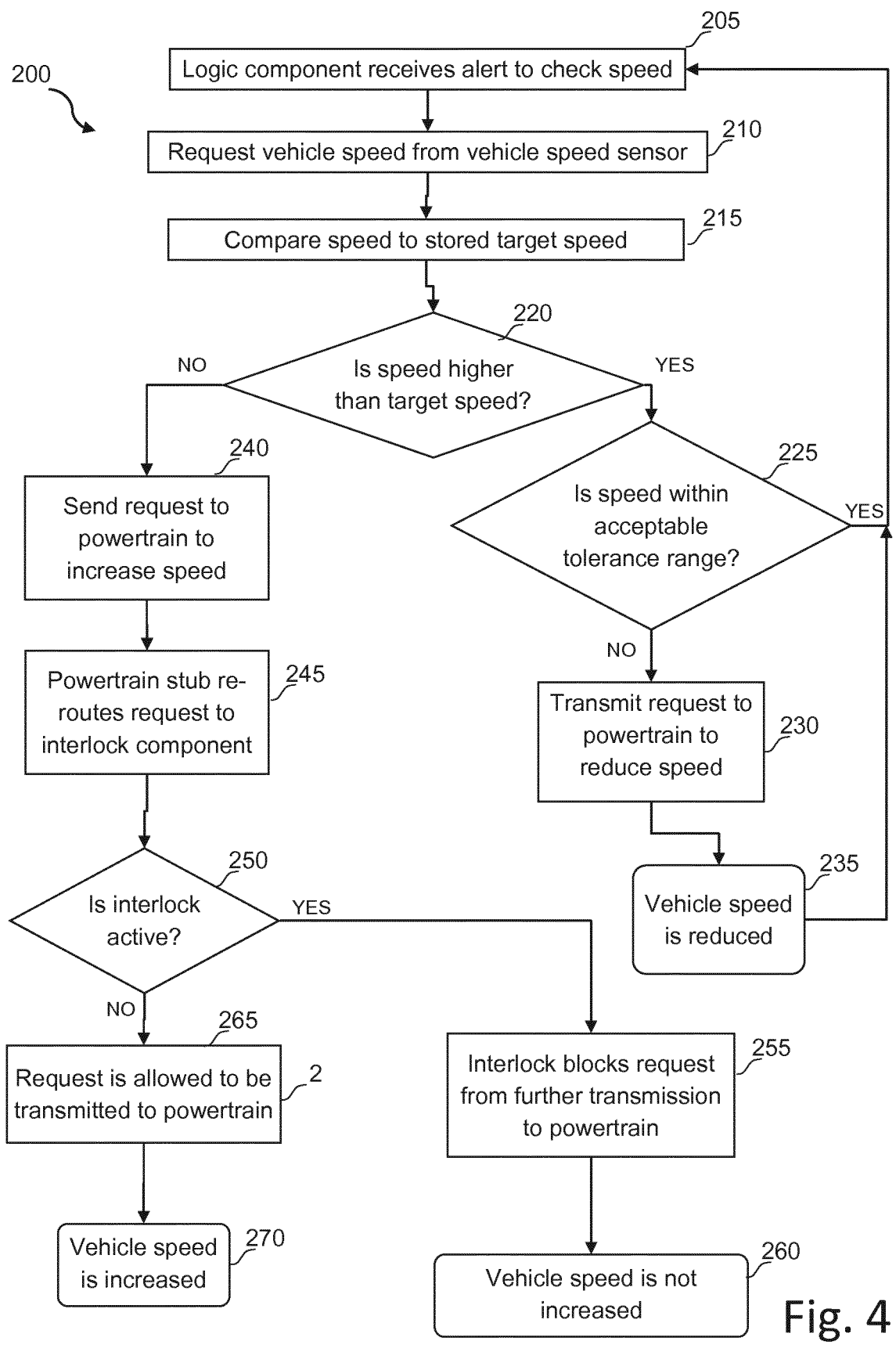
FIG. 4 is a flow diagram of a process of communicating an interaction request between two components in the vehicle control system of FIG. 3.
Figure 5:
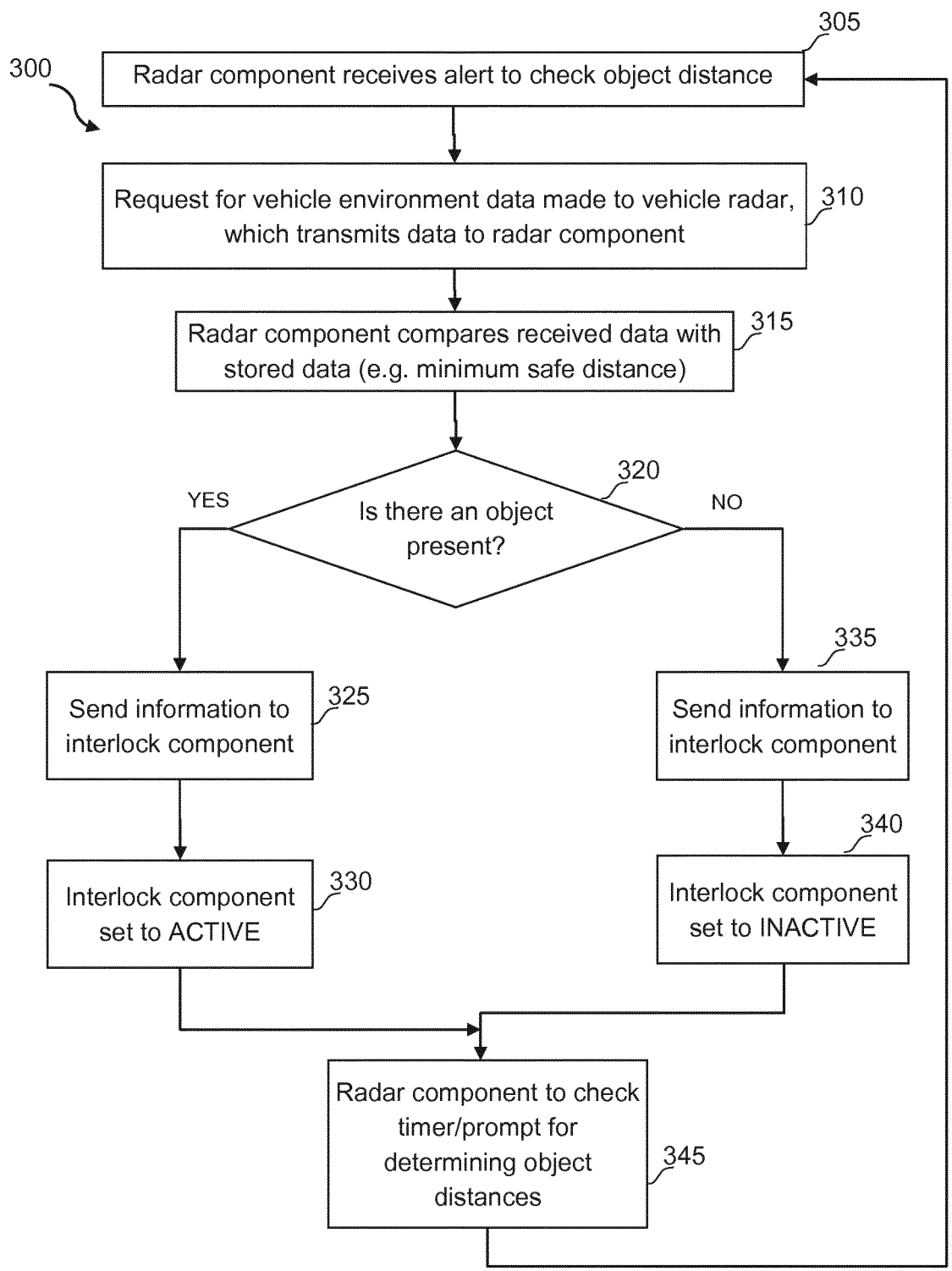
FIG. 5 is a flow diagram of a process of determining if an interaction request satisfies pre-defined vehicle logic rules, as implemented in the vehicle control system of FIG. 3.

FIGS. 4 and 5 are flow diagrams showing how an interaction request is handled by a VCS 1 according to an embodiment of the present invention. FIG. 4 shows the processes involved in transmitting an interaction request between components in the VCS 1 shown in FIG. 3, while FIG. 5 focuses on the process by which the functionality of the interlock component 74 is determined.

The process 200 in FIG. 4 begins with Step 205 where the logic component 66 receives an alert to check the speed of the vehicle 2. This alert may be prompted by the use of a timer module 68, which may be incorporated into the logic component 66 and determines whether a pre-determined time has elapsed since the last speed check was made. For example, the timer 68 could be set to alert the logic component 66 every 50 ms that a speed check is required. Upon receiving this alert, the logic component 66 sends a request at Step 210 to the sensor component 60 to determine the instantaneous speed of the vehicle and to subsequently transmit this data back to the logic component 66. The logic component 66 then compares the received speed data to a stored target speed in Step 215, and determines in Step 220 whether the speed indicated by the data is higher or lower than the stored target speed. Alternatively or additionally, the system could poll the speed sensor in order to obtain the vehicle speed data. In other words, the system (specifically the logic component) could monitor the vehicle speed sensor, to check whether the speed indicated by the data is higher or lower than the stored target speed.

If the instantaneous speed of the vehicle is determined to be higher than the target speed, the logic component 66 checks in Step 225 if that speed lies within a predetermined acceptable tolerance of the target speed. For example, if the target cruising speed was 70 mph, the acceptable tolerance could be between 68 and 72 mph, for example. If the speed lies within the acceptable tolerance of the target speed, the logic component 66 does not generate an interaction request, returns to step 205 and waits for the next speed check alert.

If the speed lies outside the pre-determined acceptable tolerance of the target speed, the logic component generates an interaction request at Step 230 to the powertrain 52 to reduce the speed of the vehicle. This request is transmitted from the logic component 66, through the powertrain proxy 72 and stub 62, to the powertrain 52 at Step 235. The vehicle speed is thereby reduced, and the logic component 66 waits for the next speed check alert.

Alternatively, if the instantaneous speed of the vehicle is determined in Step 220 to be lower than the target speed, the logic component 66 generates an interaction request at Step 240 for the vehicle speed to be increased (including in that request the desired speed increment), and transmits the request via the powertrain proxy 72, to the powertrain stub 62. At Step 245, the powertrain stub 62 determines that the interaction request falls into a specific pre-defined category of requests, and re-routes the request directly to the interlock component 74. At Step 250, the interlock component 74 runs a routine to determine its status (i.e. whether the interlock is active or inactive).

In this particular VCS embodiment, the functionality of the interlock component 74 is determined based on the presence of an object (e.g. another vehicle) in the vicinity of the vehicle 2 in which the interlock component 74 is implemented. Referring now to FIG. 5, the status (and hence the functionality) of the interlock component 74 is determined in the following manner.

The process 300 begins with Step 305, where the radar component 64 in the ECU receives an alert to update the vehicle environment data (i.e. determine if there is an object in the vicinity of the vehicle) by requesting a reading from the vehicle radar 56. This alert may optionally be prompted by a timer (not shown) associated with the radar component 64 operating in a similar manner to the timer associated with the logic component 66, or it may be prompted by a request for vehicle environment data from the interlock component 74. Irrespective of the manner in which the alert is prompted, the radar component 64 transmits at Step 310 a request to the vehicle radar 56 for vehicle environment data (which includes information relating to the distance to the nearest object). The vehicle radar 56 carries out measurements to provide this vehicle environment data, and transmits the readings to the radar component 64. In Step 315, the radar component 64 processes the received vehicle environment data, and applies its pre-defined internal logic rules to compare the information obtained with pre-stored data. It thereby determines in Step 320 whether an object is present in the vicinity of the vehicle. The pre-stored data may include (but is not limited to) the minimum safe distance between the vehicle and other objects, as pre-determined by the specific safety requirements of the vehicle.

If the radar component 64 determines that an object is present, it transmits this information to the interlock component 74 in Step 325. The interlock component 74 then applies in Step 330 its pre-defined vehicle logic rules (based on the presence of an object as determined by the radar component 64) and determines that its status should be set to 'Active'.

Alternatively, in the case where the radar component 64 determines that there is no object present which would constitute a safety risk, it transmits this information to the interlock component 74 in Step 335. The interlock component 74 then applies in Step 340 its vehicle logic rules (based on the absence of an object) and determines that its status should be set to 'Inactive'.

It should be noted that it is not necessary for the radar component itself to determine, from the vehicle environment data, whether an object is present in the vicinity of the vehicle. It would also be possible for the radar component to process the vehicle environment data received from the radar, and pass this processed data to a separate component to carry out the determining step. This separate component would then relay the conclusion as to the presence of an object to the interlock component, so that Steps 330 or 340 may be carried out.

Regardless of the resultant status of the interlock component 74, the radar component 64 then checks the timer or awaits a subsequent prompt from the interlock component 74 (based on the original system setup) to carry out a subsequent determination if there is an object present in the vehicle vicinity.

Now returning to FIG. 4, the interlock component 74 runs at Step 250 the routine of FIG. 5 to determine whether it is 'Active' or 'Inactive'. If it is 'Active', the interlock component 74 blocks at Step 255 the transmission of the interaction request from the powertrain stub 62. The interlock component 74 therefore effectively prevents the transmission of the interaction request any further, and the powertrain 52 does not receive the request to increase the vehicle speed. The vehicle speed remains unchanged by the powertrain 52 in Step 260. On the other hand, if the interlock component 74 is 'Inactive', the interaction request is transmitted in Step 265 back to the powertrain stub 62, and then on to the powertrain 52, which acts to increase in Step 270 the speed of the vehicle by the amount indicated in the interaction request.

The interlock component according to embodiments of the present invention communicates with the powertrain proxy and stub which are intermediate system components rather than with the cruise control component and powertrain component directly.

Amending the operation of the cruise control and/or powertrain component would likely require redesign of these components which potentially would be a time consuming and costly process. Furthermore, these components may be managed and designed by a third party compared to the vehicle manufacturer.

Interaction of the interlock with the intermediate system components therefore allows incorporation into the vehicle system to be achieved in a more flexible way via the generation of suitably amended stub and proxy components as described in relation to FIGS. 6 and 7 below.

Figure 6:
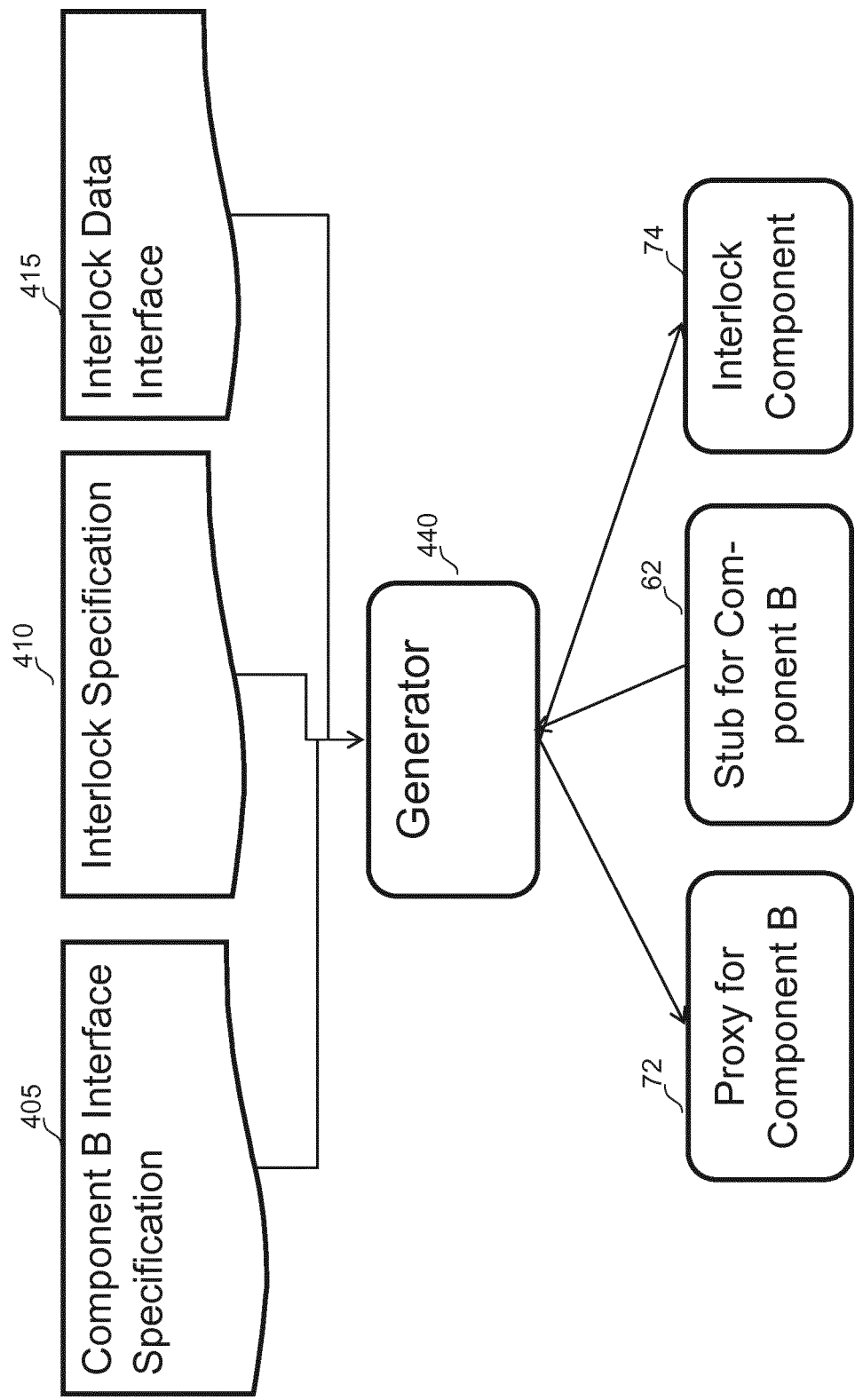
FIG. 6 is a high-level flow diagram of the inputs that are required, and the outputs that are obtained, in the generation of specific components of the vehicle control system of FIG. 3.
Figure 7:
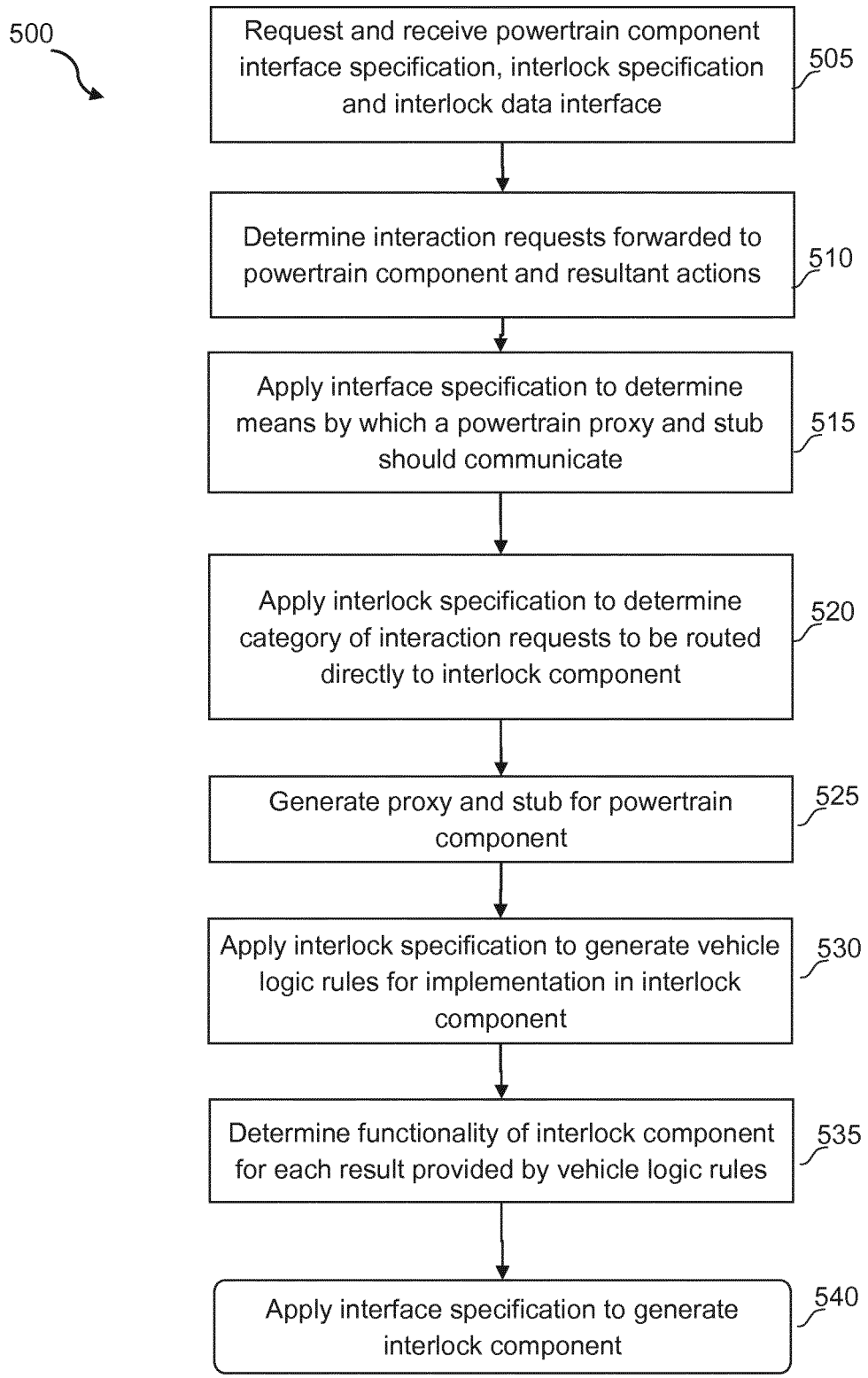
FIG. 7 is a flow diagram of the process of generating an interlock component which is compatible with vehicle system components.

FIG. 6 is a high-level generalised flow diagram showing the inputs utilised and outputs produced in a method for generating specialised components of a VCS according to an embodiment of the present invention. It should be noted that FIG. 6 presents the method in terms of generic components in a system (with the references to Component B), as this generation method may be applied to any control system which requires the use of interlock components. However, taken in the context of the specific embodiments of vehicle cruise control systems that are described herein, it will be clear to the skilled person that Component B corresponds to the powertrain component of the VCS as shown in FIGS. 1-4.

Three main forms of input data are required for this process—the powertrain (Component B) interface specification 405, the interlock specification 410 and the interlock data interface 415. The output components are a powertrain (Component B) proxy 72 and stub 62, as well as an interlock component 74 which is able to communicate directly with the powertrain stub 62.

The data which is provided to the component generator module 440 by the powertrain interface specification 405 includes information regarding the requirements for communicating successfully with the powertrain 52. For example, the parameters that may be received by the powertrain, other main system components which are authorised to communicate with the powertrain and a set of rules governing the results of each communication.

The interlock specification 410 comprises a form of logical statement which determines when the interlock should be enforced based on the system environment (e.g. logic rules determining whether the interlock should be active or inactive).

The interlock data interface 415 comprises information relating to the requirements for enabling communication between the interlock component 74 and other main system components, including the type of information, the form in which the information is expected to be received, as well as the system components with which the interlock component 74 will need to communicate.

The process 500 of generating specialised VCS components (including an interlock component which is compatible with specific vehicle system components) for use in the vehicle cruise control embodiments presented herein will now be described with reference to FIG. 7.

In Step 505, the component generator module 440 requests the input of the powertrain component interface specification 405, the interlock specification 410 and the interlock data interface 415. The component generator module 440 then determines at Step 510 which of the interaction requests forwarded to the powertrain component 52, and therefore which of specific actions intended to be carried out by the powertrain component 52, will require the implementation of the interlock component's 74 'interaction blocking' functionality. This determining step is carried out using a combination of the data obtained from the powertrain component interface specification 405 and the interlock specification 410.

The component generator module 440 then determines at Step 515 the means by which a powertrain proxy 72 and a powertrain stub 62 will be able to communicate with one another as well as other main system components. In particular, this step involves using the input data from the powertrain component interface specification 405 to determine how the powertrain proxy 72 will communicate with the powertrain 52; and input data from the interlock data interface specification 410 to determine how the powertrain stub 62 will communicate with the interlock component 74. The component generator module 440 then determines at Step 520, using the input data from the interlock specification 410, a category of interaction requests (received from the powertrain proxy 72) which should be re-routed directly to the interlock component 74 and not to the powertrain 52. A powertrain proxy 72 and a powertrain stub 62 comprising the above functionalities are subsequently generated at Step 525 by the component generator module 440.

In Step 530, the component generator module 440 uses the input data from the interlock specification 410, to generate a set of vehicle logic rules which the interlock component 74 will use to analyse interaction requests that it receives from the powertrain stub 62. The component generator module 440 then determines at Step 535 the functionality of the interlock component 74 (in accordance with known safety requirements) based on each result as provided by the vehicle logic rules. The component generator module 440 then uses the input data from the interlock data interface 415 and the interlock specification 410, as well as the known interface requirements of the powertrain stub 62 (which has been generated), to generate at Step 540 the interlock component 74 which has the ability to communicate with the powertrain stub 62.

The final products of this method of component generation are a powertrain proxy 72 and stub 62, and an interlock component 74, which are specifically tailored to interact with one another according to the safety requirements for the VCS. An advantage of generating the powertrain proxy and stub in the same process as the interlock component is that this allows the specific safety requirements of a particular vehicle to be easily incorporated into the system without requiring any modifications being made to the main (off-the-shelf) system components. In particular, the powertrain itself is completely unaffected by the incorporation of the interlock component into the system. Furthermore, if the safety requirements for the system were to change after the system is implemented (either due to changing industry standards or following slight vehicle modifications), the powertrain proxy and stub and the interlock component could be re-generated easily without requiring any alterations to be made to the main system components.

An additional advantage of this component generation method is that the output components and modules are generated in a standardised manner. This means that subsequent troubleshooting and debugging of the components post-production is much simpler than it would have been with off-the-shelf components, where the programming and functionality is supplier-dependent.

By producing bespoke flexible intermediary components, the herein described vehicle control system implementation means and method, as well as the herein described method of generating intermediary components for such a system, have increased the ease, and decreased the cost, associated with producing a vehicle control system and has overcome the problems of the prior art.

Many modifications may be made to the above examples without departing from the scope of the present invention as defined in the accompanying claims.

Alternative embodiments of the VCS described herein and the associated methods of transmitting data are envisaged for implementation in an ignition control system, for example, one which utilises the results from a breathalyser to determine whether the engine of a car may be started.

In one alternative embodiment, the ignition control of the vehicle would be analogous to the powertrain of the present system, and a breathalyser component incorporated into the VCS would be analogous to the vehicle radar of the present system. In this embodiment, an interlock component would be introduced in between the ignition control and the breathalyser component (and would communicate with a corresponding ignition control stub) to prevent the engine from being started in the event that a negative result was obtained from the breathalyser.

The invention claimed is:

1. A vehicle control system comprising:
a first system component; and
an interlock component;
wherein the first system component comprises a proxy component and a stub component interface;
wherein a second system component is arranged to send interaction requests to the first system component via the proxy component of the first system component;
wherein the first system component is in operative communication with a first vehicle system and each interaction request comprises a control signal for controlling the first vehicle system;
wherein the stub component is arranged to receive the interaction requests from the proxy component and forwards the interaction requests to the interlock component;
wherein the interlock component comprises:
an input for receiving the interaction requests for the first system component from the stub component and system data;
a processor arranged to assess each interaction request and the system data relative to predefined system logic rules to determine if the interaction request satisfies the system logic rules; and
an output arranged to cause the interaction request to be forwarded to the first system component in the event that the system logic rules are satisfied, wherein the output is further arranged to not cause the interaction request to be forwarded to the first system component in the event that the system logic rules are not satisfied.

2. The vehicle control system of claim 1, wherein the output is arranged to output the interaction request back to the stub component for forwarding to the first system component in the event that the system logic rules are satisfied.

3. The vehicle control system of claim 1, wherein the first system component controls an actuator and the second system component issues commands to the actuator.

4. The vehicle control system of claim 1, wherein the second system component comprises a logic component which is in communication with a sensor.

5. The vehicle control system of claim 1, wherein the system data is received by the interlock component from a third system component.

6. The vehicle control system of claim 5, wherein the third system component is a radar component in operative communication with a vehicle radar.

7. The vehicle control system of claim 1, wherein the system data corresponds to vehicle environment data and comprises information relating to the presence of an object in the vicinity of the vehicle.

8. The vehicle control system of claim 1, wherein the first system component is a powertrain or vehicle driveline system component and the second system component is a cruise control system component.

9. The vehicle control system of claim 8, wherein the cruise control system component comprises a logic component which is in communication with a vehicle speed sensor.

10. The vehicle control system of claim 8, wherein the interaction request comprises a request for the powertrain component to increase the vehicle speed.

11. The vehicle control system of claim 1 comprised in a vehicle.

12. A method of implementing an interlock for a first vehicle system, the first vehicle system being controlled by a first system component, wherein the first system component comprises a proxy component and a stub component interface, and further wherein a second system component sends interaction requests to the first system component via the proxy component of the first system component, the method comprising:
receiving at the stub component the interaction requests from the proxy component;
forwarding the interaction requests to an interlock component;
receiving at an input of the interlock component the interaction requests for the first system component from the stub component and system data;
assessing at the interlock component each interaction request and the system data relative to predefined system logic rules to determine if the interaction request satisfies the system logic rules;

forwarding the interaction requests to the first system component in the event that the system logic rules are satisfied; and not forwarding the interaction requests to the first system component in the event that the system logic rules are not satisfied.

13. The method of claim 12, further comprising computer-readable instructions for a computer to carry out the method and stored on a computer storage medium.

14. The method of claim 12, further comprising executable computer program instructions to implement the method and stored on a non-transitory computer readable storage medium.

* * * * *